Oct. 7, 1952        H. A. KUEHNEL        2,612,717
FISH LURE

Filed March 7, 1949                          2 SHEETS—SHEET 1

INVENTOR.
HENRY A. KUEHNEL
BY
Lynn Latta
—ATTORNEY—

Oct. 7, 1952  H. A. KUEHNEL  2,612,717
FISH LURE

Filed March 7, 1949  2 SHEETS—SHEET 2

INVENTOR.
HENRY A. KUEHNEL
BY Lynn Latta
—ATTORNEY—

Patented Oct. 7, 1952

2,612,717

UNITED STATES PATENT OFFICE 2,612,717

FISH LURE

Henry A. Kuehnel, Santa Monica, Calif.

Application March 7, 1949, Serial No. 79,985

17 Claims. (Cl. 43—42.14)

This invention relates to fish lures. The invention is directed particularly to lures of the type having an irregular movement in the water and has, as a primary object, to provide an improved means for producing a spinning or waving or irregularly moving effect. Another object is to provide a lure having a body member that is extremely inexpensive. In this respect, the invention contemplates utilizing an object found in nature, namely a sea shell, as the body member of a fish lure, and utilizing the outer lip thereof as a vane for causing the lure to spin or have an irregular motion in the water.

A further object is to provide a fish lure of improved appearance. Another object is to provide a lure having a surface finish which will not deteriorate with age.

A further object is to provide a lure having an improved and simplified swivel mechanism.

Other objects will become apparent in the ensuing specifications and appended drawings in which.

Figure 1:
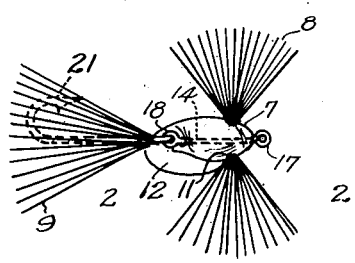
Fig. 1 is a plan view of a lure of the fly type embodying my invention.
Figure 2:
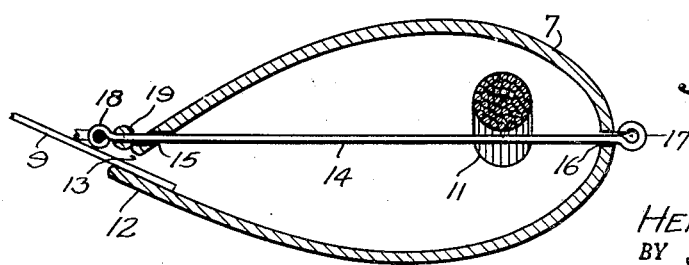
Fig. 2 is an enlarged longitudinal sectional view of the same taken on the line 2—2 of Fig. 1.

Referring first to Figs. 1 and 2, I have shown therein as one embodiment of my invention, a fish lure of the "fly" type comprising a body member 7, wings 8, tail 9 and a mounting shaft 14. The wings 8 and tail 9 (which may be referred to generically as the "feathers" of the lure) are constructed from stiff fibres that will not become limp in the water. I find that nylon or synthetic plastic fibres of the type used for tooth brushes are ideally suited to this purpose. Such fibres may be obtained in various colours and the invention contemplates the use of this material as the preferred material for the wings and tail. However, it is to be understood that other materials, such as bristles or natural feathers, may be employed.

The plastic is a preferred material. It can be secured in many different colours, and the invention thereby utilizes various colours in producing lures of highly attractive appearance. The natural feathers employed in the lure of Fig. 3 may be parakeet feathers having natural colouring in many different colours.

Figure 12:
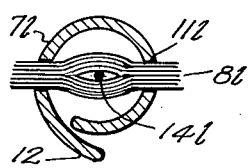
Fig. 12 is a transverse sectional view of the lure of Fig. 12, taken on the line 12—12 of Fig. 11.

The wings 8 are passed through the body 7 from side to side, through openings 11 therein as in Fig. 12, and are fanned out and bent sufficiently to give them a permanent set in the fanned positions, whereby they are fan shaped. The same may be observed with respect to tail 9. The fibres of tail 9 are secured in the gap 13 between the inner portion of the rear end of the body and the outer lip 12 thereof. They may be secured in place by applying a drop of cement to their one end, inserting these ends in the gap 13, in contact with the lip 12 and allowing the cement to set.

In the form of the invention shown in Figs. 1 and 2, shaft 14 extends through openings 15 and 16 in the respective ends of the body 7, having at one end an eye 17 for the attachment of a leader, and having at its other end a small eye or loop 18, and an anti-friction bearing bead 19 interposed between the loop 18 and the tail portion 13 of the body. A gang of hooks 21 is anchored to terminal eye 18.

The body 7 comprises a small sea shell of a type that is spiral in cross section, terminating in the outer lip 12. Fig. 12 shows how the outer lip 12 extends spirally from the major axis of the sea shell. The action of the water on the outer lip 12 is such as to cause the shell to tend to rotate about the shaft 14, which is disposed substantially at the longitudinal axis of the shell.

The shells have a natural polish and a multi-coloured finish, often in pastel colours, which gives the finished lure a very attractive appearance and makes it unnecessary to subject it to any painting or enamelling operation as is customarily done in the manufacture of lures. Also, the finish is permanent, being destructible only with the destruction of the shell itself.

The body 7 utilizes preferably a mollusk shell of the species Olividae, of elongated ovate form, spiral in cross section, and with the lip 12 forming the outer terminus of the spiral and extending generally tangentially from the inner portion of the body. This species of mollusk shell is commonly referred to as an "olive." In its natural shape, it has a fine polish and is usually beautifully coloured and marked. Thus the shell in its natural state provides a brightly coloured finish which excels the artificial finishes ordinarily applied to the bodies of fish lures. Consequently, it is unnecessary to utilize any finishing step in the manufacture of my improved fish lure, nor to undertake the expense of dies, etc., and expense is correspondingly greatly reduced.

In order to preserve the finish of the shell, I utilize shells with the live mollusks in them, immerse them in fresh water for a period sufficient to kill the mollusk (I find that a half hour will usually be ample time for this purpose). I then remove the animal by forcing air through the opening 16, which has been previously bored in the large end of the shell. After this treatment, the finish remains permanent and unfading, whereas the finish on shells of mollusks, which die in nature, become dull and faded.

Figure 3:
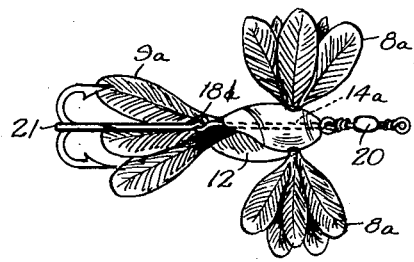
Fig. 3 is a plan view of a lure embodying a modified form of the invention.

Fig. 3 illustrates how natural feathers 8a may be employed for the wings of a fly instead of the fibres 8. Fig. 3 also illustrates the use of a swivel 20 connected to the forward end of the shaft 14a. In this case, the entire "lure" including shaft 14a and hooks 21 will tend to rotate on the swivel 20. The winged flies shown in Figs. 1 and 3 will not ordinarily rotate, but will have an undulating or irregular movement in the water as the result of the rotative torque.

Figure 4:
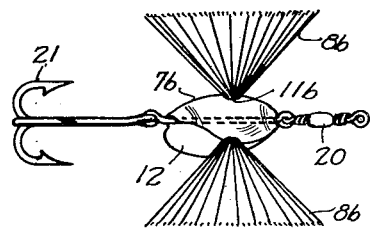
Fig. 4 is a plan view of a lure embodying another modified form of the invention.
Figure 5:
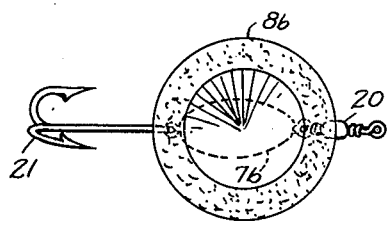
Fig. 5 is a side view of the lure shown in Fig. 4.

Fig. 4 illustrates how a novel design incorporating conical wings can be embodied in a fly having the invention incorporated therein. The conical wings 8b are formed by passing a number of fibres through openings 11b in opposite sides of the shell 7b, and then spreading them to conical form. When thus spread, the wings 8b are adapted to be retained securely in the openings 11b because of the conical shape of the wings which resist pulling of the fibres through the openings.

Figure 6:
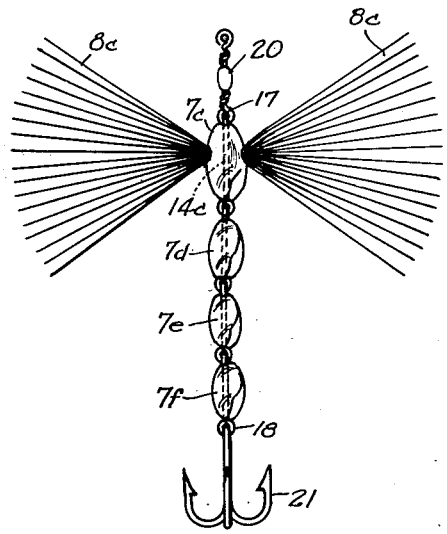
Fig. 6 is a plan view of a lure embodying another modified form of the invention.

Fig. 6 illustrates a lure simulating a dragon fly. In this case, a plurality of the shells 7c, 7d, 7e and 7f are linked together by chain links 14c each passing through a respective shell. A gang of hooks 21 is secured to an eye 18 on the last link. Other hooks may be secured to other links. A swivel member 20 is secured to an eye on the foremost chain link 14c. Wings 8c are mounted on the body 7c in the same manner as in Fig. 1.

Figure 8:
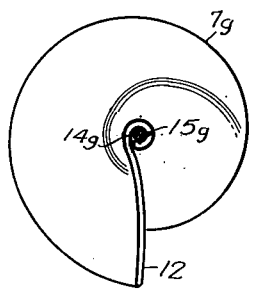
Fig. 8 is a rear end sectional view of the same taken on the line 8—8 of Fig. 7.
Figure 7:
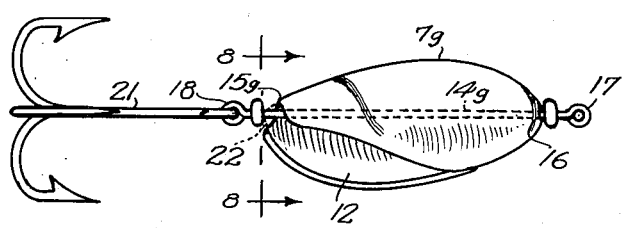
Fig. 7 is a plan view of a lure embodying another modification of the invention.

Figs. 7 and 8 illustrate a lure having no "feathers," comprising simply a body 7g mounted for free rotation on a shaft 14g extending therethrough longitudinally. The shaft has at its forward end an eye 17 for attachment to a leader, and at its rear end an eye 18 to which is attached a gang of hooks 21. The shaft 14g passes through an opening 16 drilled through the forward end of the body 7g and a C-shaped opening 15g at the tail end of the body, formed by grinding off the tail tip (indicated in dotted lines at 22) of the natural shell.

Figure 9:
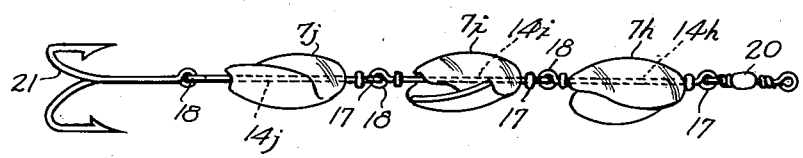
Fig. 9 is a plan view of a lure embodying another modified form of the invention.

Fig. 9 illustrates a series of body members 7h, 7i and 7j mounted on shafts 14h, 14i and 14j linked together, to a leader swivel 20, and to a gang of hooks 21, by means of eyes 17 and 18 respectively. The body members 7h, 7i and 7j will rotate on their respective shafts, and the entire lure may rotate on swivel 20.

Figure 10:
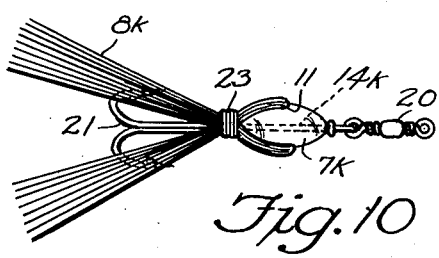
Fig. 10 is a plan view of a lure embodying another modified form of the invention.

Fig. 10 illustrates a lure in which feathers 8k are passed through openings 11 in body 7k, bent rearwardly and bound together by a bind 23 so as to project rearwardly. A gang of hooks 21 is anchored to the rear end of shaft 14k on which body 7k is mounted.

Figure 11:
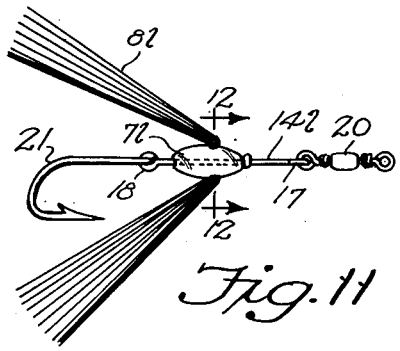
Fig. 11 is a plan view of a lure embodying another modified form of the invention.

Fig. 11 illustrates a lure similar to that of Fig. 10, except that "feathers" 8l are bent rearwardly without being bound together.

Figure 13:
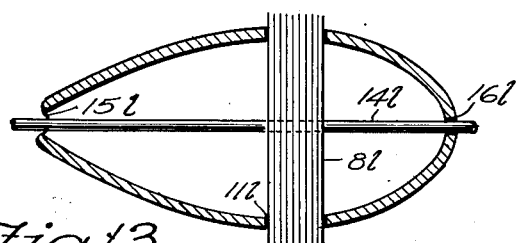
Fig. 13 is a longitudinal sectional view of the same, taken on the line 13—13 of Fig. 12.

Figs. 12 and 13, which show sectional views of Fig. 11, illustrates the general principles of construction of all of the winged lures, with the exception that the rear bearing opening 15l for shaft 14l is an open-sided recess as in Figs. 7 and 8, instead of the drilled opening 15 of Figs. 1 and 2.

The winged lures of Figs. 1, 3, 4, 6, 10 and 11 will float on the surface when pulled in the water, whereas the lures of Figs. 7 and 9 will travel below the surface when drawn through the water. The body members 7d, 7e and 7f of Fig. 6, 7g of Fig. 7 and 7h, 7i and 7j of Fig. 9 will rotate, whereas the winged lures of Figs. 1, 3, 4, 6, 10 and 11 will undulate.

I claim:

1. In a fish lure, a body comprising a mollusk shell of the Olividae species, generally of elongated ovate form, spiral in cross section and having a lip projecting at an acute angle to the opposing portion of the body, a leader fitting at the forward end of said body, having a swivel connection therewith, a hook connection at the rear end of said body and wings secured to and projecting from said body.

2. A lure as defined in claim 1, wherein said wings comprise bristle-like fibres.

3. A lure as defined in claim 1, wherein said wings comprise bristle-like fibres of synthetic plastic material.

4. A lure as defined in claim 1, wherein said wings consist in natural feathers.

5. In a fish lure, a body comprising a mollusk shell of the Olividae species, generally of elongated ovate form, spiral in cross section and having a lip projecting at an acute angle to the opposing portion of the body, a leader fitting at the forward end of said body having a swivel connection with said body, a hook connection at the rear end of said body, and decorate appendages secured to and projecting from said body, said lip functioning in the water as a vane tending to rotate said body in the water and resulting in an irregular motion in the water.

6. In a fish lure, a body comprising a single mollusk shell of the Olividae species, generally of elongated ovate form, spiral in cross section and having a lip projecting at an acute angle to the opposing portion of the body, said body having openings extending transversely therethrough and a plurality of bristle-like elements extending through said openings and secured therein, projecting from the respective sides of the body and fanned out to provide simulated wings, a leader fitting at the forward end of said body, having a swivel connection with said body, and a hook connection on the rear end of said body.

7. In a fish lure, a body consisting in a mollusk shell, generally of elongated ovate form, spiral in cross section and having a lip projecting at an acute angle to the opposing portion of the body, said body having openings extending transversely therethrough and a plurality of bristle-like elements extending through said openings and secured therein, projecting from the respective sides of the body and fanned out to provide simulated wings; and a shaft extending longitudinally through said body, a leader fitting at the forward end of said body, having a swivel connection with said shaft at its forward end, and, at the rear end of said body a connection on said shaft for anchoring a fish hook to the body.

8. A fish lure as defined in claim 7, wherein said body has at its forward and rear ends, openings through which said shaft extends, said openings having walls functioning as bearings, and said lip functioning in the water as a vane tending to cause said body to rotate on said shaft, and said lure including a swivel connection between said shaft and said leader connection.

9. A fish lure as defined in claim 6, wherein said body has an inner rear end portion spaced from said lip to define a gap, and including a plurality of flexible elements extending into said gap, secured to the body and projecting rearwardly to simulate a tail.

10. A lure as defined in claim 6, wherein said bristle-like elements are arranged in conical array on the respective sides of the body.

11. In a fish lure, a body element comprising a mollusk shell of the Olividae species, the tail tip of said shell being removed to provide a bearing opening of C-shape, said shell having a bearing opening disposed on its major axis at its forward end, and a mounting shaft extending through said openings.

12. In a fish lure, a body comprising a mollusk shell of the Olividae species, generally ovate in form, spiral in cross section and having a lip projecting at an acute angle to the opposing portion of the body, a leader connection at one end of said body, and a hook connection at the other end of said body.

13. In a fish lure, a plurality of body elements comprising mollusk shells of the Olividae species, generally ovate in form, spiral in cross section and having a lip projecting at an acute angle to the opposing portion of the body, said body elements having openings at their forward and rear ends, chain links extending through said openings and linking said body elements together, a hook connection to the rear one of said body elements, and a leader connection to the forward one of said body elements.

14. In a fish lure, a body comprising a mollusk shell, generally of elongated ovate form, spiral in cross section and having a lip projecting at an acute angle to the opposing portion of the body, a leader fitting at the forward end of said body, having a swivel connection with said body, and a hook connection at the rear end of said body.

15. A fish lure as defined in claim 6, wherein said bristle-like elements are tied together immediately behind the rear end of said body.

16. A lure as defined in claim 14, wherein said hook connection comprises a series of chain links attached to the rear end of said body and extending rearwardly therefrom; said lure further including a fish hook connected to the rear one of said chain links, and a series of additional body elements mounted upon respective chain links.

17. A lure as defined in claim 14, wherein said body has at its forward and rear ends respectively, axially aligned bearing openings; and including a shaft extending axially through said body and through said openings and journalled therein, said swivel connection being attached to the forward end of said shaft and said hook connection being embodied in the rear end portion of said shaft; said lip functioning in the body as a vane tending to cause said body to rotate on said shaft.

HENRY A. KUEHNEL.

No references cited.